United States Patent [19]

Barquist, Jr. et al.

[11] 4,160,212
[45] Jul. 3, 1979

[54] RADIO FREQUENCY RECEIVER HAVING SERIALLY COUPLED HETERODYNING STAGES, EACH STAGE HAVING FILTERS WITH DIFFERENCE CENTER FREQUENCIES

[75] Inventors: William S. Barquist, Jr., Solvang; Robert S. Hutcheon, Goleta, both of Calif.

[73] Assignee: Raytheon Company, Lexington, Ky.

[21] Appl. No.: 800,994

[22] Filed: May 26, 1977

[51] Int. Cl.$^2$ .............................................. H04B 1/26
[52] U.S. Cl. .................................... 325/432; 325/11; 325/435; 325/439
[58] Field of Search ................. 325/11, 345, 431, 432, 325/435, 438, 439, 460, 461, 363, 455, 462; 324/77 E; 179/15 AA

[56] References Cited

U.S. PATENT DOCUMENTS

| | | | |
|---|---|---|---|
| 2,407,212 | 9/1946 | Tunick | 325/11 |
| 2,926,304 | 2/1960 | Fromm | 324/77 E |
| 3,399,278 | 8/1968 | Dahlman | 179/15 AA |
| 3,614,627 | 10/1971 | Runyan | 325/432 |
| 3,678,387 | 7/1972 | Wilson | 325/11 |
| 3,940,697 | 2/1976 | Morgan | 325/462 |

*Primary Examiner*—Robert L. Griffin
*Assistant Examiner*—Jin F. Ng
*Attorney, Agent, or Firm*—Richard M. Sharkansky; Joseph D. Pannone

[57] ABSTRACT

A radio frequency signal receiver having a plurality of serially coupled frequency converter stages adapted to convert the frequency of a signal having a frequency within a first predetermined band of frequencies to a frequency within a second, smaller predetermined band of frequencies. Each one of the frequency converter stages includes a plurality of bandpass filters, each one thereof being adapted to pass signals within a different portion of a predetermined band of frequencies, and heterodyning means for converting the frequency of a signal passed by any one of the plurality of bandpass filters to a frequency within a smaller predetermined band of frequencies.

4 Claims, 5 Drawing Figures

RADIO FREQUENCY RECEIVER HAVING SERIALLY COUPLED HETERODYNING STAGES, EACH STAGE HAVING FILTERS WITH DIFFERENCE CENTER FREQUENCIES

BACKGROUND OF THE INVENTION

This invention relates generally to radio frequency signal receivers and more particularly to heterodyne receivers used to determine the frequency of a received signal.

It is well known in the art that the modulation components of radio frequency (RF) signals may be amplified and then detected after "down conversion" in a conventional heterodyne receiver. In the ordinary heterodyne receiver designed for use when the carrier frequency of the received signal is, a priori, not known, at least the first intermediate local oscillator is arranged to be tunable. Thus, as is well known, a predetermined difference signal (usually referred to as the I.F. signal) may be produced by mixing the local oscillator signal with a received RF signal. The modulation components of the RF signal then are translated to identical modulation components on an I.F. carrier. Such translated modulation components, after being passed through an I.F. amplifier (which may also be considered to be a bandpass filter) may then be detected.

In many applications, a conventionally tuned heterodyne receiver is not satisfactory. For example, if the frequency of a radio frequency pulse signal is not known, the time taken to tune the local oscillator may be too great. Also, another shortcoming of a conventional heterodyne receiver derives from the contrary requirements for ease of tuning and resolution between different radio frequency signals. The requirement for the former is that the bandpass of the I.F. amplifier be as wide as possible while the requirement for the latter is that the bandpass of the I.F. amplifier be, ideally, no wider than the band of the modulation components. There are many known ways in which the conflicting requirements may be met. For example, a second conversion stage may be added to the receiver such that a second local oscillator is varied through a band of frequencies displaced from a first intermediate frequency band to produce a second down converted signal, or an intermediate frequency signal may be impressed on a comb filter and the energized one, or ones, of the channels therein may be detected. The latter approach, however, is limited for a fixed number of filters in the comb filter. For example, to cover a frequency band of 2–4 GHz with a frequency resolution of 4 MHz, 500 filters in the comb filter would be required.

SUMMARY OF THE INVENTION

With this background of the invention in mind, it is therefore an object of this invention to provide an improved radio frequency receiver to permit reception of a radio frequency signal over a bandwidth substantially greater than a predetermined resolution bandwidth without requiring variable tuning of the receiver.

It is another object of the invention to provide an improved radio frequency receiver having fixed bandwidth filters, the frequency resolution of the filter being greater than the bandwidth of the receiver divided by the number of fixed bandwidth filters.

It is another object of the invention to provide an improved radio frequency receiver of the type mentioned above, such receiver being adapted to provide a substantially instantaneous indication of the frequency of a received radio frequency signal.

These and other objects of the invention are attained generally by providing a radio frequency receiver having a plurality of serially coupled frequency converter stages adapted to convert the frequency of a signal having a frequency within a first predetermined band of frequencies to a frequency within a second, smaller predetermined band of frequencies, each one of such frequency converter stages including: a plurality of bandpass filters adapted to pass signals within a different portion of a predetermined band of frequencies; and heterodyning means for converting the frequency of a signal passed by any one of the plurality of bandpass filters to a frequency within a smaller predetermined band of frequencies. A logic network is included to indicate which bandpass filter, or filters, in each one of the frequency converter stages passes a signal, or signals, and to provide an indication of the frequency of a received signal or signals. An up converter section may also be included to enable retransmission of a radio frequency signal having the same frequency as the frequency of the received signal.

BRIEF DESCRIPTION OF THE DRAWINGS

The foregoing features of this invention, as well as the invention itself, may be more fully understood from the following detailed drawings, in which.

DESCRIPTION OF THE PREFERRED EMBODIMENT

Figure 1:
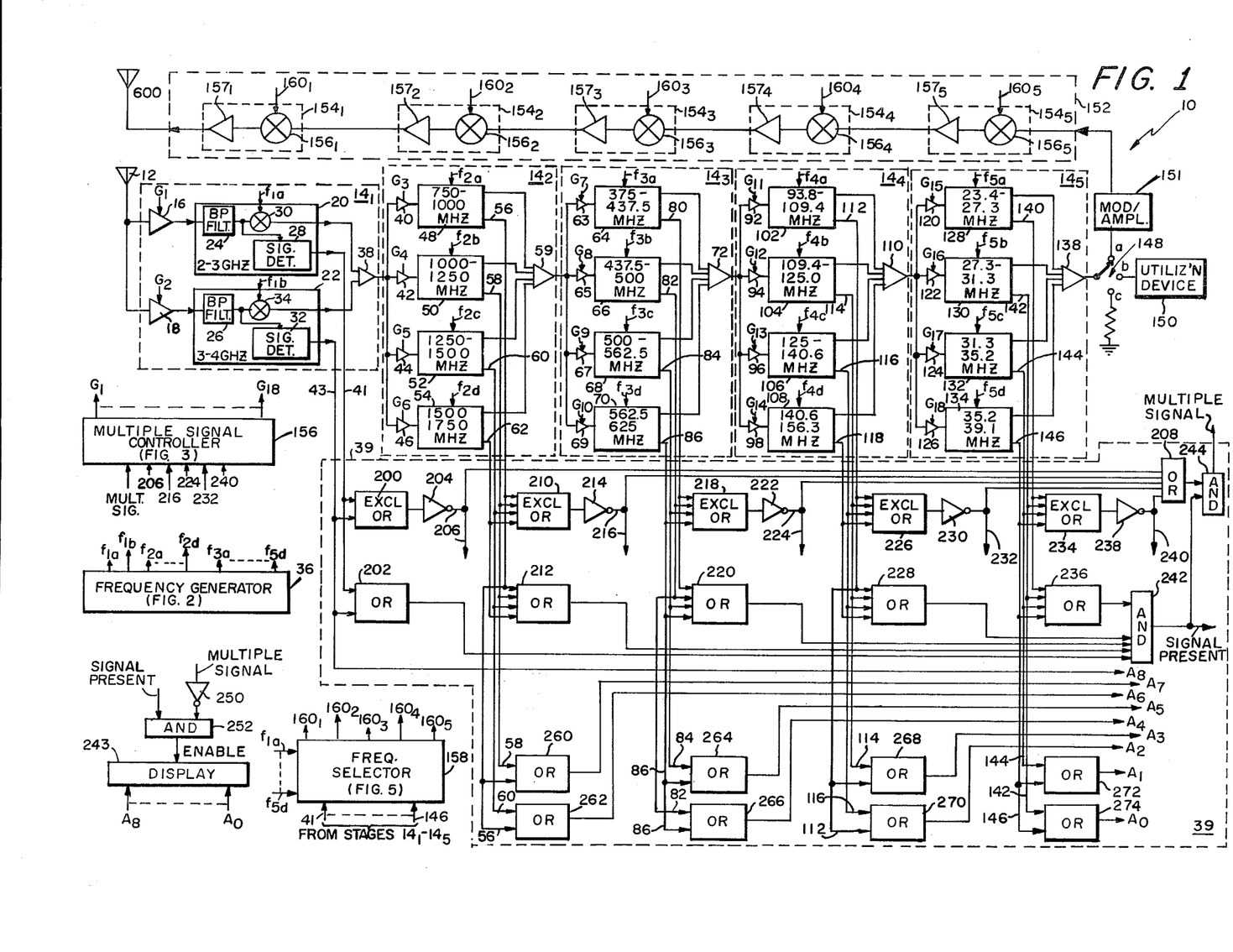
FIG. 1 is a block diagram of a signal receiver system according to the invention.

Referring now to FIG. 1, a radio frequency receiver system 10 operative over a predetermined frequency band, here a 2000 MHz bandwidth (which extends from 2 GHz to 4 GHz), is shown to include a plurality of, here 5, serially coupled frequency converter stages $14_1$–$14_5$, fed by a receiving antenna 12, as shown. Each one of such frequency converter stages $14_1$–$14_5$ is similar in construction and includes a plurality of bandpass filters adapted to pass signals within a first predetermined band of frequencies, each one of the plurality of bandpass filters being adapted to pass signals within a different portion of the first predetermined band of frequencies, and heterodyning means for converting the frequency of a signal passed by any one of the plurality of bandpass filters to a frequency within a second, smaller, predetermined band of frequencies.

Thus, referring first to the frequency converter stage $14_1$, such stage $14_1$ includes a pair of gated amplifiers 16, 18 and filter/heterodyning sections 20, 22 arranged as shown. Filter/heterodyning section 20 includes a bandpass filter 24 tuned to the lower half of the receiver frequency band (here 2–3 GHz) and filter/heterodyning section 22 includes a bandpass filter 26 tuned to the upper half of the receiver frequency band (here 3–4 GHz). Therefore, when gated amplifiers 16, 18 are gated "ON" by enable signals on lines $G_1$, $G_2$, respectively, received radio frequency signals having frequencies within the lower half of the receiver band are passed through bandpass filter 24 and are rejected by bandpass filter 26, whereas received radio frequency signals having frequencies within the upper half of the receiver band are passed by bandpass filter 26 and are rejected by bandpass filter 24. The received radio frequency signals passed by bandpass filter 24 are fed to a signal, or threshold, detector 28 and to a mixer 30, and the received radio frequency signals passed by bandpass filter 26 are fed to a signal, or threshold, detector 32 and a mixer 34. The signal detectors 28, 32 are of any conventional design and are used to provide an indication of the presence of received radio frequency signals which pass through bandpass filters 24, 26, respectively, for purposes to be described. Suffice it to say here that the outputs of signals detectors 28, 32 are fed to a logic network 39 via lines 41, 43, respectively, as indicated. Mixers 30, 34 are used for heterodyning the signals fed thereto from bandpass filters 24, 26, respectively, with local oscillator signals produced by frequency generator 36 (in a manner to be described in detail in connection with FIG. 2) on lines $f_{1a}$, $f_{1b}$, respectively as shown. The output of mixers 30, 34 are fed to a summing amplifier/bandpass filter 38. The mixers 30, 34 convert the frequencies of signals passed through bandpass filter 24 and the frequencies of signals passed through bandpass filter 26 to frequencies within a common band of intermediate frequencies, here a band of frequencies which cover a bandwidth equal to one half the bandwidth of the receiver (that is, here a bandwidth of 1000 MHz which here extends from 750 MHz to 1750 MHz). It follows then that the frequency of the local oscillator signal on line $f_{1a}$ is here 3750 MHz, the frequency of the signal on line $f_{1b}$ is here 4750 MHz, and the pass band of the summing amplifier/bandpass filter 38 extends from 750 MHz to 1750 MHz.

The signals passed through summing amplifier/bandpass filter 38 are fed to the second frequency converter stage $14_2$. Frequency converter stage $14_2$ here includes four channels, each one being "tuned" to a different quarter of the 1000 MHz pass band of summing amplifier/bandpass filter 38 to: (1) convert signals within such pass band into a band of frequencies which extends over a band of frequencies one quarter the width of such pass band, i.e., here 250 MHz; and (2) detect the presence of signals within each one of the four channels. In particular, the four channels include gated amplifiers 40, 42, 44 and 46 and filter/heterodyning sections 48, 50, 52 and 54, such being similar in construction to filter/heterodyning sections 20, 22. That is, each one of such sections 48, 50, 52 and 54 includes a band pass filter (not shown) the output of which is coupled to a mixer and a signal, or threshold, detector (not shown). Therefore, filter/heterodyning sections 48, 50, 52 and 54 pass signals fed thereto which are within the frequency bands 750 to 1000 MHz, 1000 to 1250 MHz, 1250 to 1500 MHz and 1500 to 1750 MHz, respectively, to summing amplifier/bandpass filter 59 after such fed signals are converted in frequency to a frequency within a common band of intermediate frequencies which cover a bandwidth equal to one quarter the pass band of summing amplifier/bandpass filter 38, that is to cover a bandwidth, here 250 MHz. The pass band of the summing amplifier/bandpass filter 59 is 250 MHz and here extends from 375 MHz to 625 MHz. Consequently, local oscillator signals on lines $f_{2a}$, $f_{2b}$, $f_{2c}$ and $f_{2d}$ have frequencies of 1375 MHz, 1625 MHz, 1875 MHz and 2125 MHz, respectively. Further threshold detectors (not shown) included in filter/heterodyning sections 48, 50, 52, 54 provide an indication of the presence of signals with such sections 48, 50, 52, 54, respectively. That is, the presence of signals in stage $14_2$ having frequencies within frequency bands: from 750 MHz to 1000 MHz; from 1000 MHz to 1250 MHz; from 1250 to 1500 MHz; and from 1500 MHz to 1750 MHz are indicated by logical signals on lines 56, 58, 60 and 62, respectively.

The signals passed by summing amplifier/bandpass filter 59 are fed to the third converter stage $14_3$, as indicated. Frequency converter stage $14_3$ here includes four channels each one being tuned to a different quarter of the 250 MHz pass band of summing amplifier 59 to: (1) convert signals within such pass band into a band of frequencies which extends over a band of frequencies one quarter the width of such pass band, i.e., here 62.5 MHz, and (2) detect the presence of signals within each one of the four channels. In particular, the four channels include gated amplifiers 63, 65, 67, 69 and filter/heterodyning sections 64, 66, 68, 70, such being similar in construction to filter/heterodyning sections 20, 22. That is, each one includes a bandpass filter (not shown), the output of which is coupled to a mixer (not shown) and signal, or threshold, detector (not shown). Here filter/heterodyning sections 64, 66, 68, 70 pass signals fed thereto which are within the frequency bands 375 to 437.5 MHz, 437.5 to 500 MHz, 500 to 562.5 MHz and 562.5 to 625 MHz, respectively, after such fed signals are heterodyned to a common band of intermediate frequencies which cover a bandwidth equal to one quarter of the pass band of summing amplifier/bandpass filter 59, here 62.5 MHz, to a summing amplifier/bandpass filter 72. Therefore, the pass band of summing amplifier/bandpass filter 72 is 62.5 MHz and here extends from 93.75 to 156.25 MHz. Consequently, local oscillator signals on lines $f_{3a}$, $f_{3b}$, $f_{3c}$, $f_{3d}$ here have frequencies 531.25 MHz, 593.75 MHz, 656.25 MHz and 718.75 MHz, respectively. Further threshold detectors (not shown) included in filter/heterodyning sections 64, 66, 68, 70 provide an indication of the presence of signals within sections 64, 66, 68, 70, respectively, that is, the presence of signals in stage $14_3$ having frequencies within the frequency bands: from 375 MHz to 437.5 MHz; from 437.5 MHz to 500 MHz; from 500 MHz to 625 MHz are indicated by logical signals on lines 80, 82, 84 and 86, respectively.

The signals passed by summing amplifier/bandpass filter 72 are fed to the fourth converter stage $14_4$ as indicated. Frequency converter stage $14_4$ here includes four channels each one being tuned to a different quarter of the 62.5 MHz pass band of summing amplifier/filter 72 to: (1) convert signals within such pass band to a band of frequencies which extends over a band of frequencies one quarter the width of such pass band, i.e., here 15.625 MHz; and (2) detect the presence of signals within each one of the four channels. In particular, the four channels include gated amplifiers 92, 94, 96, 98 and filter/heterodyning sections 102, 104, 106, 108, such being similar in construction to filter/heterodyning sections 20, 22, that is, each one includes a bandpass filter (not shown), the output of which is coupled to a mixer (not shown) and signal, or threshold, detector (not shown). Here filter/heterodyning sections 102, 104, 106, 108 pass signals fed thereto which are within the frequency bands 93.75 to 109.375 MHz, 109.375 to 125 MHz, 125 to 140.625 MHz and 140.625 to 156.25 MHz, respectively, and, after such fed signals are heterodyned to a common band of intermediate frequencies which covers a bandwidth equal to one quarter of the pass band of summing amplifier/bandpass filter 72, here 15.625 MHz, are passed to summing amplifier/bandpass filter 110. Therefore, the pass band of summing amplifier/bandpass filter 110 is 15.625 MHz and here extends from 23.4 MHz to 39.1 MHz. Consequently, local oscillator signals on lines $f_{4a}$, $f_{4b}$, $f_{4c}$, $f_{4d}$ here have frequencies 132.8125 MHz, 148.4375 MHz, 164.0625 MHz and 179.6875 MHz, respectively. Further, threshold detectors (not shown) included in filter/heterodyning sections 102, 104, 106, 108 provide an indication of the presence of signals within sections 102, 104, 106, 108 respectively, that is the presence of signals in stage $14_4$ having frequencies within the frequency bands: from 93.75 MHz to 109.375 MHz; from 109.375 MHz to 125.0 MHz; from 125.0 MHz to 140.625 MHz; and from 140.625 MHz to 156.25 MHz are indicated by logic signals on lines 112, 114, 116, 118, respectively.

The signals passed by summing amplifier/bandpass filter 110 are fed to the fifth, and here last, converter stage $14_5$ as indicated. Frequency converter stage $14_5$ here includes four channels each one being tuned to a different quarter of the 15.625 MHz pass band of the summing amplifier/filter 110 to: (1) convert signals within such pass band to a band of frequencies which extends over a band of frequencies one quarter the width of such pass band, i.e., here 3.90625 MHz; and (2) detect the presence of signals within each one of the four channels. In particular, the four channels include gated amplifiers 120, 122, 124, 126 and filter/heterodyning sections 128, 130, 132, 134 (such being similar in construction to filter/heterodyning sections 20, 22, that is each one includes a bandpass filter the output of which is coupled to a mixer and signal or threshold detector). Here, filter/heterodyning sections 128, 130, 132, 134 pass signals fed thereto which are within the bands 23.4375 MHz to 27.34375 MHz, 27.34375 to 31.25 MHz, 31.25 to 35.15625 MHz, and 35.15625 to 39.0625 MHz, respectively, and, after such fed signals are heterodyned to a common band of intermediate frequencies which covers a bandwidth equal to one quarter of the pass band of summing amplifier/bandpass filter 110, here 3.90625 MHz, are passed to summing amplifier/bandpass filter 138. Therefore, the pass band of summing amplifier/bandpass filter 138 is 3.90625 MHz and extends from 6.16 MHz to 9.77 MHz. Consequently, local oscillator signals on lines $f_{5a}$, $f_{5b}$, $f_{5c}$, $f_{5d}$ here have frequencies 33.203125 MHz, 37.109375 MHz, 41.015625 MHz and 44.921875 MHz, respectively. Further, threshold detectors (not shown) included in filter/heterodyning sections 128, 130, 132, 134 provide an indication of the presence of signals within sections 128, 130, 132, 134, respectively, that is, the presence of signals in stage $14_5$ having frequencies within the frequency bands: from 23.4375 MHz to 27.34375 MHz; from 27.34375 MHz to 31.25 to MHz; from 31.25 MHz to 35.15625 MHz; and from 35.15625 MHz to 39.0625 MHz are indicated by logic signals on lines 140, 142, 144, 146, respectively.

The signals produced at the output of summing amplifier/bandpass filter 138 are fed to one of three ports of a switch 148 selectively in accordance with the particular application of the receiver. When coupled to port "b", the received signals are fed to a utilization device 150 which here includes any conventional detector for detecting modulation components, i.e., AM, FM, or PM, for example, which may be imposed on the received radio frequency carrier signal. When switch 148 is in position "c", the signal at the output of amplifier/filter 138 is coupled to ground through a suitable load, and logic network 39 provides an indication of the frequency of the received radio frequency signal in a manner to be described. When switch 148 is in position "a", the signals produced by amplifier/filter 138 are fed to a modulator/amplifier 151 to modulate and amplify such signals in any desired manner and are then passed to an up converter section 152 to convert such signals to a radio frequency signal, here having its original carrier frequency, in a manner to be described.

Figure 2:
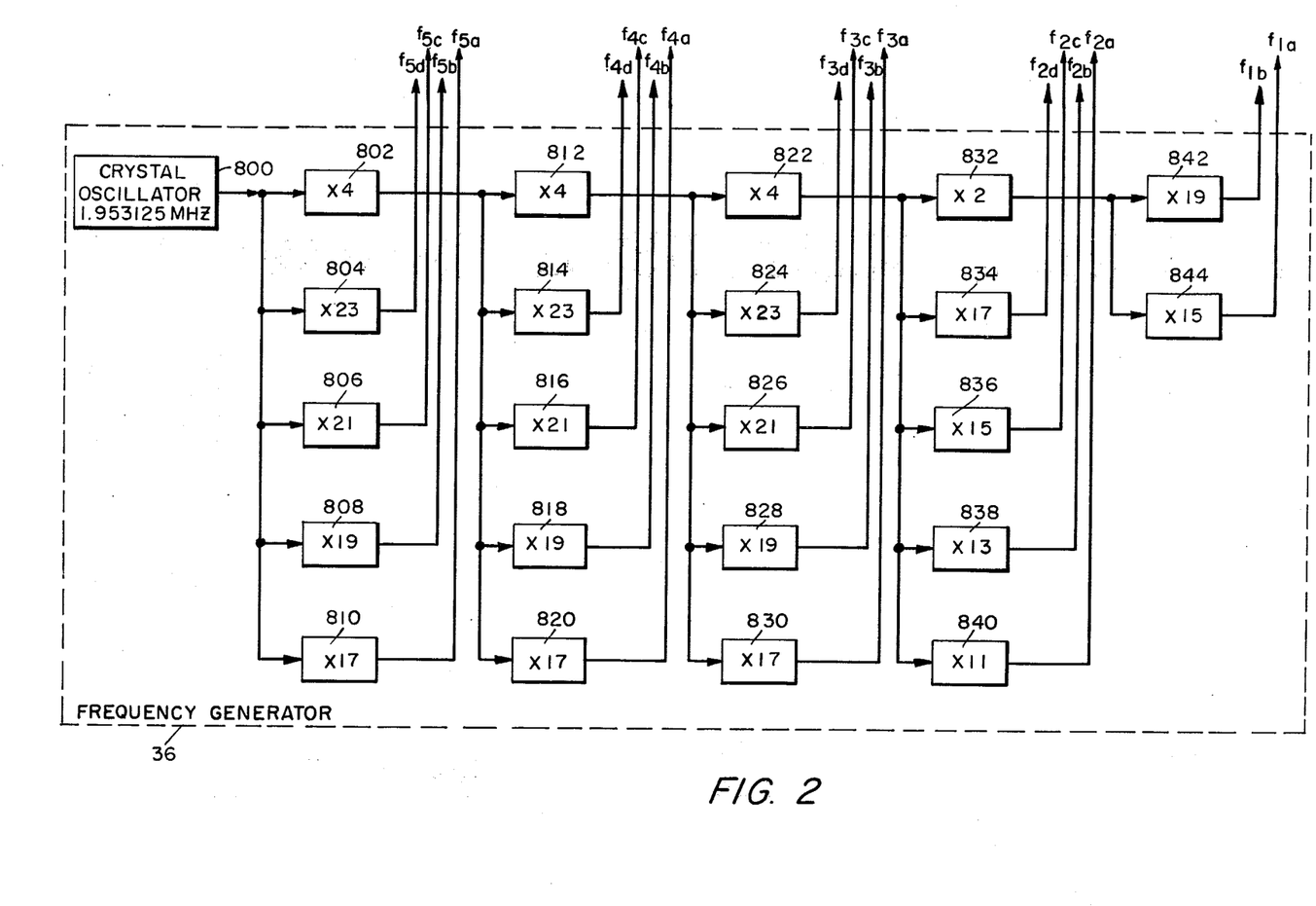
FIG 2 is a block diagram of a frequency generator used in the signal receiver system of FIG. 1.

Referring now to FIG. 2, frequency generator 36 is shown to include a crystal oscillator 800, here producing a signal having a frequency 1.953125 MHz. Such signal is fed to a plurality of frequency multipliers 802–844, arranged as shown, to produce signals having the following frequencies on the lines indicated below:

| line | frequency (MHz) |
|---|---|
| $f_{1a}$ | 3750 |
| $f_{1b}$ | 4750 |
| $f_{2a}$ | 1375 |
| $f_{2b}$ | 1625 |
| $f_{2c}$ | 1875 |
| $f_{2d}$ | 2125 |
| $f_{3a}$ | 531.25 |
| $f_{3b}$ | 593.75 |
| $f_{3c}$ | 656.25 |
| $f_{3d}$ | 718.75 |
| $f_{4a}$ | 132.8125 |
| $f_{4b}$ | 148.4375 |
| $af_{4c}$ | 164.0625 |
| $f_{4d}$ | 179.6875 |
| $f_{5a}$ | 33.203125 |
| $f_{5b}$ | 37.109375 |
| $f_{5c}$ | 41.015625 |
| $f_{5d}$ | 44.921875 |

Referring to FIG. 1., and considering first switch 148 being coupled to port "c" as when the receiver 10 is used to determine the frequency of the received radio frequency signal, let it be assumed, as an example, that the received radio frequency signal has a frequency of 2837 MHz. Further, let it be assumed that enabling signals are applied to all gated amplifiers 16, 18, 40, 42, 44, 46, 63, 65, 67, 69, 92, 94, 96, 98, 120, 122, 124, 126 by the multiple signal controller 156 in a manner to be described in detail in connection with FIG. 3 to gate "ON" all such amplifiers. The received radio frequency signal, here having a frequency of 2837 MHz, is rejected by the bandpass filter 26 of filter/heterodyning section 22 and is passed by the bandpass filter 24 of filter/heterodyning section 20, and the passed signal is frequency converted in such section 20, by the signal on line $f_{1a}$ and mixer 30, and is then fed to summing amplifier/bandpass filter 38 as a corresponding signal having a frequency of 913 MHz. Further, a logical 1 is produced on line 41 and a logical 0 is produced on line 43 by the signal detectors 28, 32, respectively, included in the filter/heterodyning sections 20, 22. The frequency converted signal produced at the output of summing amplifier/bandpass filter 38 is fed to the second converter stage $14_2$ where such signal is rejected by filter/heterodyning sections 50, 52, 54 and is passed by the filter/heterodyning section 48, after frequency converted by such section 48 (i.e., mixed with the signal on line $f_{2a}$), to summing amplifier/bandpass filter 59 to produce a corresponding signal having a frequency of 462 MHz. Further, a logical 1 is produced on line 56 by the filter/heterodyning section 48 and logical 0's are produced on lines 58, 60, 62 by the filter/heterodyning sections 50, 52 and 54, respectively. The frequency converted signal produced at the output of summing amplifier/bandpass filter 59 is fed to the third frequency converter stage $14_3$ where such signal is rejected by filter/heterodyning sections 64, 68, 70, and is passed by the filter/heterodyning section 66 (where it is mixed with the signal on line $f_{3b}$) to summing amplifier/bandpass filter 72 to produce a corresponding signal having a frequency of 131.75 MHz. Further, a logical 1 is produced on line 82 by the filter/heterodyning section 66 and logical 0's are produced on lines 80, 84, 86 by the signal detectors of filter/heterodyning sections 64, 68 and 70, respectively. The frequency converted signal produced at the output of summing amplifier/bandpass filter 72 is fed to the fourth frequency converter stage $14_4$ where such signal is rejected by filter/heterodyning sections 102, 104, 108 and is passed by the filter/heterodyning section 106, after frequency converted by such section 106 (by mixing such signal with the signal on line $f_{4c}$), to summing amplifier/bandpass filter 110 to produce a corresponding signal having a frequency of 32.3125 MHz. Further, a logical 1 is produced on line 116 by the filter/heterodyning section 106 and logical 0's are produced on lines 112, 114, 118 by the signal detectors of filter/heterodyning sections 102, 104, 108, respectively. The frequency converted signal produced at the output of summing amplifier/bandpass filter 110 is fed to the fifth frequency converter stage $14_5$ where such signal is rejected by filter/heterodyning sections 128, 130, 134 and is passed by filter/heterodyning section 132, after frequency converted by such section 132 (by mixing such signal with the signal on line $f_{5c}$), to summing amplifier/bandpass filter 138 to produce a corresponding signal having a frequency of 8.703125 MHz, such signal then being fed to a suitable load as indicated when switch 148 is coupled to port "c". Further, a logical 1 is produced on line 144 by the filter/heterodyning section 144 and logical 0's are produced on lines 140, 142, 146 by the signal detectors of filter/heterodyning sections 128, 130, 134, respectively.

The signals on lines 41, 43, 56, 58, 60, 62, 80, 82, 84, 86, 112, 114, 116, 118, 140, 142, 144 and 146 are fed to the logic section 39, as indicated Lines 41, 43 are fed to an exclusive OR gate 200 and an OR gate 202 and, in response to the logical signals on such lines 41, 43 based on the example being considered, exclusive OR gate 200 produces a logical 1 and OR gate 202 produces a logical 1. (It is noted that, if the received signals had frequencies in both the upper and lower halves of the 2–4 GHz band, logical 1's would have been produced on lines 41, 43 and the exclusive OR gate 200 would have produced a logical 0. Therefore, the exclusive OR gate 200 provides an indication of whether signals are in more than one portion of the band of frequencies fed to the frequency converter stage, such exclusive OR gate producing a logical 1 if signals are in but one portion of such band, and producing a logical 0 if such signals are in more than one portion of such band. Further, OR gate 202 produces a logical 1 when a signal is detected, regardless of whether such signal is in one or more than one portion of the band, and produces a logical 0 in the "absence" of a detected signal in the converter stage.) The output of exclusive OR gate 200 is passed to inverter 204. Inverter 204 produces a signal on line 206, such signal being fed to OR gate 208 and multiple signal controller 156 (the details of which will be discussed in connection with FIG. 3). Likewise, exclusive OR gate 210 produces a logical 0 when signals fed to the second converter stage 14 are being passed by more than one of the filter/heterodyning sections 48, 50, 52, 54 and produces a logical 1 when signals are being passed by only one of such sections 48, 50, 52, 54. An OR gate 212 produces a logical 1 when a signal is detected in stage $14_2$ and produces a logical 0 when a signal is not detected in stage $14_2$. An inverter 214 is coupled to the output of exclusive OR gate 214 and produces a signal on line 216, such signal being fed to OR gate 208 and the multiple signal controller 156. Continuing, exclusive OR gate 218 produces a logical 0 when signals fed to the third converter stage $14_3$ are being passed by more than one of the filter/heterodyning sections 64, 66, 68, 70 and produces a logical 1 when signals are being passed by only one of such sections 64, 66, 68, 70. An OR gate 220 produces a logical 1 when a signal is detected in stage $14_3$ and produces a logical 0 when a signal is not detected in such stage $14_3$. An inverter 222 is coupled to the output of exclusive OR gate 218 and produces a signal on line 224, such signal being fed to OR gate 208 and the multiple signal controller 156. Exclusive OR gate 226 produces a logical 0 when signals fed to the fourth converter stage $14_4$ are being passed by more than one of the filter/heterodyning sections 102, 104, 106, 108 and produces a logical 1 when signals are being passed by only one of such sections 102, 104, 106, 108. An OR gate 228 produces a logical 1 when a signal is detected in stage $14_4$ and produces a logical 0 when a signal is not detected in such stage $14_4$. An inverter 230 is coupled to the exclusive OR gate 230 and produces a signal on line 232, such signal being fed to OR gate 208 and the multiple signal controller 156. Exclusive OR gate 234 produces a logical 0 when signals fed to the fifth frequency converter stage $14_5$ are passed by more than one of the filter/heterodyning sections 128, 130, 132, 134 and produces a logical 1 when signals are being passed by only one of such sections 128, 130, 132, 134. An OR gate 236 produces a logical 1 when a signal is detected in stage $14_5$ and produces a logical 0 when a signal is not detected in such stage $14_5$. An inverter 238 is coupled to the output of exclusive OR gate 238 and produces a signal on line 240, such signal being fed to OR gate 208 and the multiple signal controller 156.

In operation, if a signal is detected in stages $14_1$, $14_2$, $14_3$, $14_4$, $14_5$, logical 1's are produced by OR gates 202, 212, 220, 228, 236. The outputs of OR gates 202, 212, 220, 228, 236 are fed to an AND gate 242 and, therefore, a logical 1 is produced on line SIGNAL PRESENT. When a signal is "not detected" in one of the frequency converter stages $14_1$–$14_5$, a logical 0 is produced on line SIGNAL PRESENT. The output of AND gate 242 is fed to display 243 (through AND gate 252) and to AND gate 244. The output of OR gate 208 is also fed to AND gate 244. Therefore, if a signal is detected in all stages $14_1$–$14_5$ (i.e., a signal is "present"), AND gate 244: (1) produces a logical 1 on line MULTIPLE SIGNAL if a signal is "present" and such "present" signal is in more than one channel of any one of the stages $14_1$–$14_5$ and (2) produces a logical 0 on line MULTIPLE SIGNAL if a signal is "present" and such "present" signal passes through only one channel of each one of the stages $14_1$–$14_5$. The line MULTIPLE SIGNAL is fed to display 243 through inverter 250 and AND gate 252 and to the multiple signal controller 156. As will become apparent, the logic network 39 here provides an indication of the frequency of the received signal only when a signal is "present" and such "present" signal passes through only one channel of each one of the stages $14_1$–$14_5$ because the output of AND gate 252 is fed to the enable line of display 243 and, therefore, only when a signal is "present" (a logical 1 on line SIGNAL PRESENT) and such "present" signal passes through only one channel of each one of the stages $14_1$–$14_5$ (i.e., MULTIPLE SIGNAL line has a logical 0), will a logical 1 be produced at the output of AND gate 252 to enable the display 243 to display digital signals on lines $A_8$–$A_0$, which represent the frequency of such signal.

The signals on lines $A_8$–$A_0$ represent a nine bit digital word indicative of the frequency of the received radio frequency signal when a logical 0 is produced on line MULTIPLE SIGNAL (i.e., a signal is present in only one channel of each stage). Line $A_8$ is the most significant bit (MSB) of such word, and line $A_0$ is the least significant bit (LSB) of such word. Line 43 (frequency converter 22) provides the signal on line $A_8$ and, therefore, if the received signal has a frequency within the band 2–3 GHz, a logical 0 is produced on line $A_8$ whereas, if such signal has a frequency within the band 3–4 GHz, a logical 1 is produced on line $A_8$. An OR gate 260 is coupled to lines 56, 58 and an OR gate 262 is coupled to lines 56, 60. Line $A_7$ is coupled to the output of OR gate 260, and line $A_6$ is coupled to OR gate 262. It follows then, that if the signal in frequency converter stage $14_2$ has a frequency within the band 750–1000 MHz, line $A_7$ is logical 1 and line $A_6$ is logical 1. If such signal has a frequency in the band 1000–1250 MHz, line $A_7$ is logical 1 and line $A_6$ is logical 0. If such signal has a frequency in the band 1250–1500 MHz, line $A_7$ is logical 0 and line $A_6$ is logical 1. And if such signal has a frequency in the band 1500–1750 MHz, lines $A_6$ and $A_7$ are both logical 0's. OR gates 264, 266 are similarly arranged to produce logical signals on lines $A_5$, $A_4$ in connection with stage $14_3$, OR gates 268, 270 for lines $A_3$, $A_2$ in connection with stage $14_4$ and OR gates 272, 274 for lines $A_1$, $A_0$ in connection with stage $14_5$.

Figure 4:
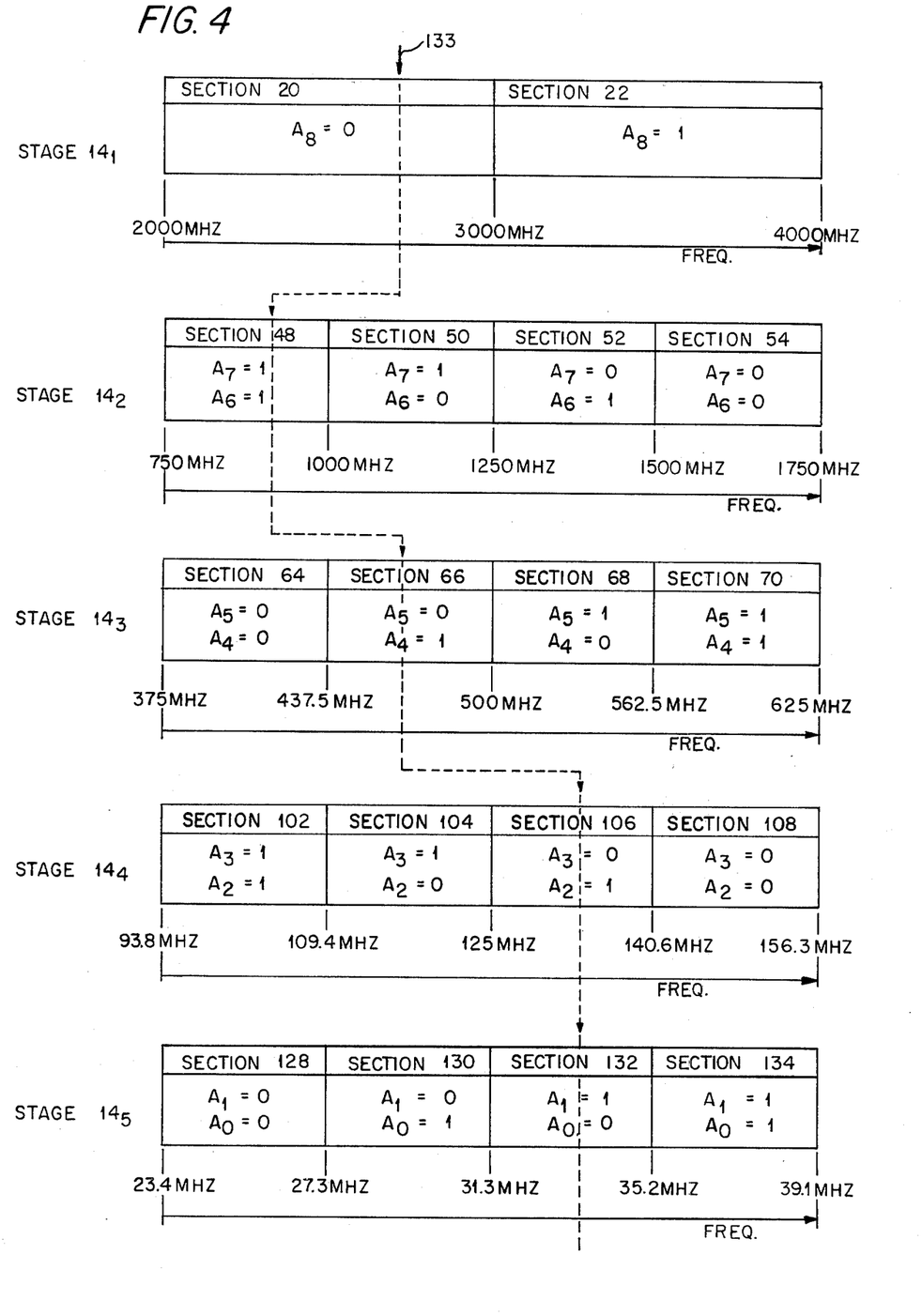
FIG. 4 is a diagram useful in understanding the operation of the signal receiver system shown in FIG. 1.

Referring also to FIG. 4, it is noted that when the received signal has a frequency less than 1000 MHz above the frequency 2 GHz (i.e., a frequency 2000 MHz–3000 MHz), the received signal passes through filter/heterodyning section 20 and line $A_8$ produces a logical 0, whereas, if such signal has a frequency greater than 1000 MHz above 2 GHz (i.e., 3000 MHz–4000 MHz), the received signal passes through section 22 and line $A_8$ produces a logical 1. The 1000 MHz band of frequencies within which the received signal is converted by frequency converter stage $14_1$ is separated into quarters by frequency converter stage $14_2$. That is, if the frequency converted signal has a frequency within the lowest quarter (750–1000 MHz) of such band, it passes through section 48 ($A_7=1$, $A_6=1$); if it has a frequency within the next highest quarter (1000–1250 MHz) of the band, it passes through section 50 ($A_7=1$, $A_6=0$); if it has a frequency in the upper third quarter of the band (1250–1500 MHz), it passes through section 52 ($A_7=0$, $A_6=1$); and, if it has a frequency within the highest quarter of the band (1500–1750 MHz), it passes through section 48 ($A_7=0$, $A_6=0$). The binary signals on lines $A_6$, $A_7$ which are developed in accordance with the path taken by the signal as it passes through stage $14_2$, are as represented in FIG. 4. A similar situation results as the signal passes successively through stages $14_3$, $14_4$ and $14_5$. Considering as an example that the received signal has a frequency of 2837 MHz, such signal passes through filter/heterodyning sections 20, 48, 66, 106, 132 as indicated by the dotted line 133 in FIG. 4 and the signals on lines $A_8$–$A_0$ are: 0, 1, 1, 0, 1, 0, 1, 1, 0, respectively. A little thought will make it apparent that the frequency of the received signal may be determined by adding 2 GHz to the following:

---

$A_8$ (1000 MHz) + $A_7$ (500 MHz) + $A_6$ (250 MHz) +
$A_5$ (125 MHz) + $A_4$ (62.5 MHz) + $A_3$ (31.25 MHz) +
$A_2$ (15.625 MHz) + $A_1$ (7.8125 MHz) +
$A_0$ (3.90625 *MHz*) + 1.953125 =
$A_8 \times 3.90625 \times 2^8$ MHz + $A_7 \times 3.90625 \times 2^7$ MHz +
$A_6 \times 3.90625 \times 2^6$ MHz + $A_5 \times 3.90625 \times 2^5$ MHz +
$A_4 \times 3.90625 \times 2^4$ MHz + $A_3 \times 3.90625 \times 2^3$ MHz +
$A_2 \times 3.90625 \times 2^2$ MHz + $A_1 \times 3.90625 \times 2^1$ MHz +
$A_0 \times 3.90625 \times 2^0$ MHz + 1.953125

---

That is, the frequency of the received signal may be calculated by just converting the binary digital word represented by $A_8$–$A_0$ into base 10, next multiplying the converted number by 3.90625 MHz and finally adding the product to 2001.953125 GHz. In the example: $(011010110)_2 = (214)_{10}$; $(214)_{10} \times 3.90625$ MHz = 835.9375; and, therefore, the calculated frequency of the received signal is 2001.953125 MHz + 835.9 MHz = 2837.890625 MHz, that is, such frequency is calculated to within 1.953125 MHz.

Having described the operation of the receiver 10 in response to a signal having a single frequency, the condition where a signal is detected in more than one channel of a frequency converter stage will now be discussed in connection with FIG. 3 and multiple signal controller 156. As discussed above in connection with the logic section 39 in FIG. 1, when such multiple signal condition exists a logical 1 is produced on the MULTIPLE SIGNAL line and the display 242 is disabled, thereby preventing display of the digital word on lines $A_8$–$A_0$. The MULTIPLE SIGNAL line is fed to the set input (S) of a flip/flop 301, such flip/flop being initially reset by any conventional means, not shown. When such flip/flop 301 is set a logical 1 is produced at its output and when such flip/flop is reset a logical 0 is produced at its output. When the MULTIPLE SIGNAL line is logical 0, (i.e., a signal is present and such signal is not in more than one channel of each of the stages $14_1$–$14_5$) flip/flop 301 being reset, produces a logical 0, and disables pulse generator 302. The logical 0 produced by flip/flop 301 is fed to inverter 300 (FIG. 3) to produce a logical 1 which is fed to lines $G_1$–$G_{18}$ via OR gates $304_1$–$304_{18}$ to enable gate "on" the gated amplifiers 16, 18, 40, 42, 44, 46, 63, 65, 67, 69, 92, 94, 96, 98, 120, 122, 124 and 126, respectively. The determination of the frequency of the received signal then progresses as described above in connection with FIG. 1 and FIG. 4.

Figure 3:
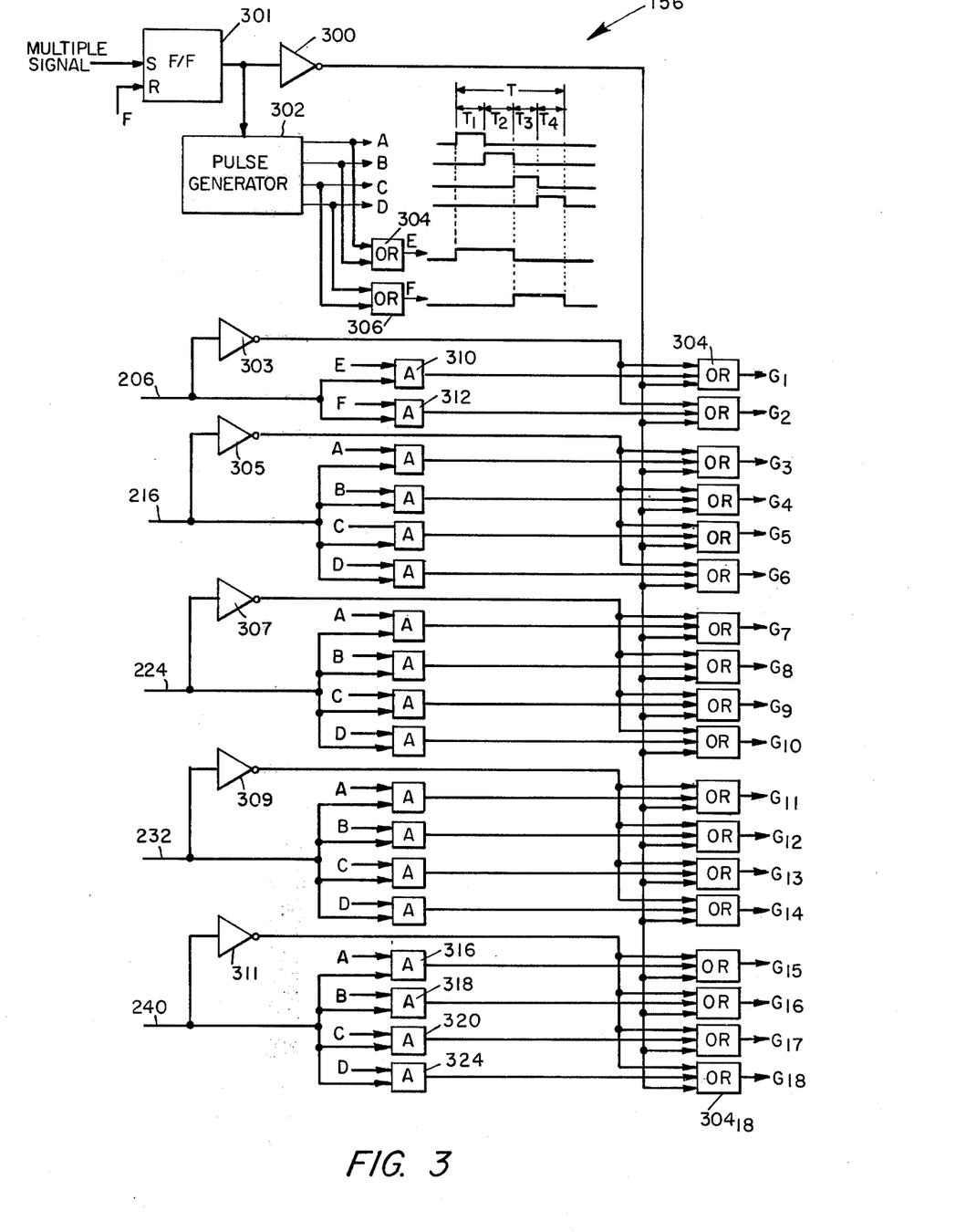
FIG. 3 is a block diagram of a multiple signal controller used in the signal receiver system of FIG. 1.

When the MULTIPLE SIGNAL line produces a logical 1, the flip/flop 301 is placed in a set condition and a pulse generator 302 is thereby triggered to produce binary signals on lines A, B, C, D, E and F as indicated in FIG. 3. The binary signal on line A is a pulse which exists during the first quarter of the period T, i.e., during the period $T_1$. The binary signals on lines B, C and D exist during the second, third and fourth quarters of the period T, respectively, i.e., during periods $T_2$, $T_3$ and $T_4$, respectively, as indicated. The binary signals on lines A and B are fed to an OR gate 304 to produce a pulse on line E which exists during the first half of the period T, i.e., during the periods $T_1$ and $T_2$.

Likewise, the binary signals on lines C and D are fed to OR gate 306 to produce a pulse on line F which exists during the second half of the period T, i.e., during the periods $T_3$ and $T_4$. If there are signals in more than one channel of frequency converter stage $14_1$, exclusive OR gate 200 (FIG. 1) and serially coupled inverter 204 (FIG. 1) produce a logical 1 signal on line 206. Line 206 is fed to AND gates 310, 312 (FIG. 3) to enable a pulse on line E, produced during the first half of the period T, to pass to line $G_1$ via OR gate $304_1$, thereby to gate "on" gated amplifier 16 (FIG. 1) during such first half of the period T and to enable a pulse on line F, produced during the second half of the period T, to pass to line $G_2$ via OR gate $304_2$, thereby to gate "on" gated amplifier 18 during such second half of the period T. Therefore, during each half of the period T only one of the signals is being analyzed and, therefore, display 243 (FIG. 1) displays the frequency associated with one of the signals during the first half of the period T and displays the frequency associated with the other signal during the second half of the period T. It is also noted that the logical 0 signals on lines 216, 224, 232, 240 are converted to logical 1 signals by inverters 305, 307, 309 and 311, respectively, so that lines $G_3-G_{18}$ gate "on" the gated amplifier in stages $14_2-14_5$ for the full period T. At the end of the period T, flip/flop 301 is reset by the trailing edge of the pulse on line F. Likewise, if signals are present in more than one channel of one of the other frequency converter stages $14_2-14_4$, the exclusive OR gate (and serially coupled inverter) associated with such stage and the MULTIPLE SIGNAL line feed logical 1 signals to the multiple signal controller 156 to enable the gated amplifiers associated with such stage to be gated "on" sequentially, each channel passing the signal fed thereto during a different quarter of the period T. For example, if a received signal passes through filter/heterodyning sections 20, 48, 64, 102 and in stage $14_5$ through both sections 128 and 130, exclusive OR gate 234 (with inverter 238) produces a logical 1 signal on line 240 and a logical 1 on MULTIPLE SIGNAL line 40 places flip/flop 301 into a set condition. AND gates 316, 318, 320, 324 are enabled by such logical 1 signal on line 240 so that pulses are applied to lines $G_{15}$, $G_{16}$, $G_{17}$, $G_{18}$ during time periods $T_1$, $T_2$, $T_3$, $T_4$, respectively, to gate "one", sequentially, gated amplifiers 120, 122, 124 and 126. Inverters 303, 305, 307 and 309 enable gating signals to be produced on lines $G_1-G_{14}$. Therefore, during the period $T_1$, the received signal passes through sections 20, 48, 64, 102 and 128 (such signal being inhibited from passing through sections 130, 132, 134), the MULTIPLE SIGNAL line produces a logical 0, the SIGNAL PRESENT line produces a logical 1, and display 242 displays the binary signals on lines $A_8-A_0$. During the period of time $T_2$, flip/flop 301 remains in a set condition, gating signals remain on lines $G_1-G_{14}$, line 240 carries a logical 1 signal and, therefore, a gating signal is produced on line $G_{16}$ and lines $G_{15}$, $G_{17}$, $G_{18}$ have logical 0 signals to gate "off" gated amplifiers 120, 124, 126. Thus, during the period of time $T_2$, the received radio frequency signal passes only through sections 20, 48, 64, 102 and 130, the MULTIPLE SIGNAL line produces a logical 0, the SIGNAL PRESENT line produces a logical 1, and display 242 displays the binary signals on lines $A_8-A_0$. During the time periods $T_3$ and $T_4$, because no signals are present in sections 132, 134, the SIGNAL PRESENT line produces a logical 0 and the display 242 is disabled. After the interval T, the flip/flop 301 is reset by the trailing edge of the pulse on line F, as described. It is to be noted that the logic network 39 has been designed to determine the frequency components of a received signal in applications where such signal passes through a single channel of each of the stages $14_1-14_5$ or through multiple channels of any one of such stages $14_1-14_5$. In applications where such signal passes through multiple channels of more than one of the stages, the multiple signal controller 156 would be appropriately modified to enable such to pass through the appropriate sections. It is also noted that, when the receiver is to be used to receive pulsed radio frequency signals having a single carrier frequency, there is no need for the multiple signal controller 156 or the gated amplifiers. Further, when used with pulsed signals, a buffering arrangement may be used to pass to the first frequency converter stage $14_1$ the received pulses in order of arrival of such pulses so that only one signal is present in the receiver at any period of time.

Figure 5:
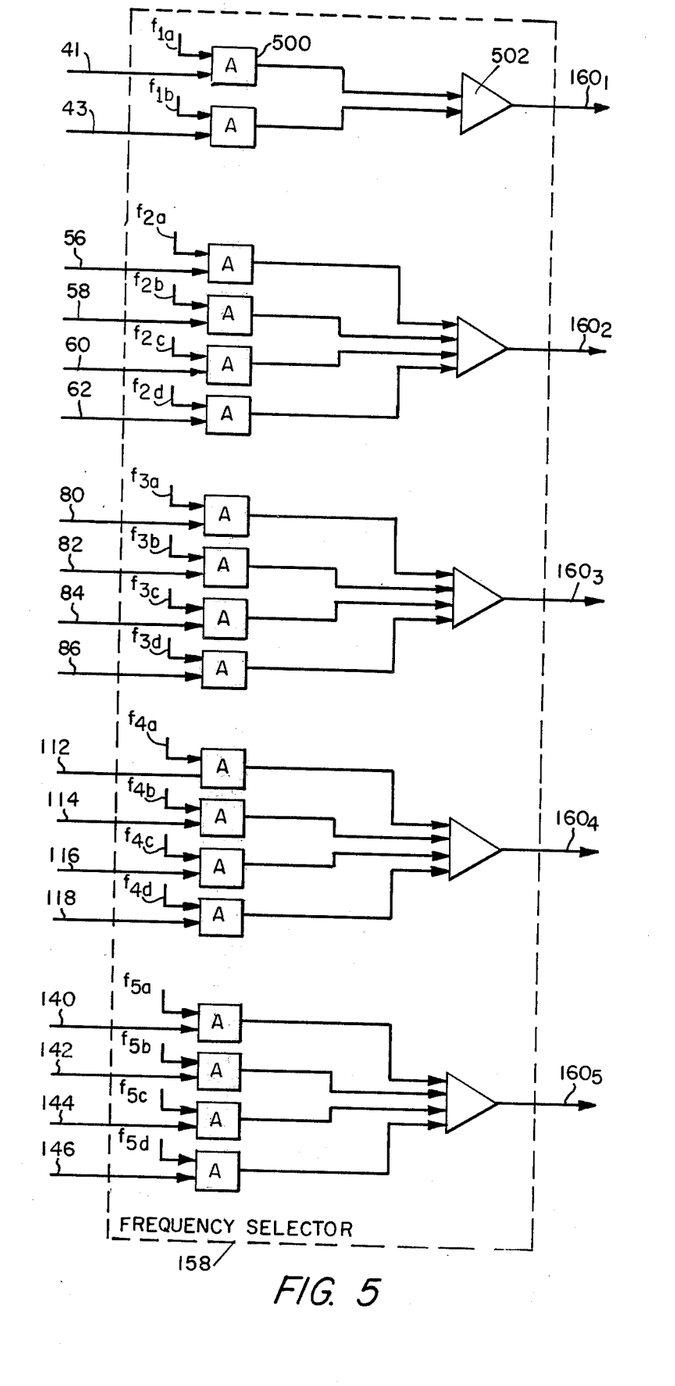
FIG. 5 is a block diagram of a frequency selector used in the signal receiver system of FIG. 1.

Considering now the application of the receiver 10 as part of transponder, i.e., when switch 148 (FIG. 1) is in position "a", the signal produced at the output of summing amplifier/bandpass filter 128 is here passed to a modulator/amplifier 151 to, for example, modulate such signal in a desired manner (i.e., add information as AM or PM or FM modulation), amplify such modulated signal and then pass the resulting signal to up converter section 152. Up converter section 152 includes here five serially coupled up converter stages $154_5-154_1$, as shown. Local oscillator frequencies are fed to such mixers $156_1-156_5$ from frequency selector 158 (FIG. 5) via lines $160_1-160_5$, as indicated. Mixers $156_5-156_1$ are followed by amplifier/bandpass filters $157_5-157_1$, respectively, as indicated. Such amplifier/bandpass filters $157_5-157_1$ have the following pass bands: 23.4375–39.0625 MHz, 93.75–156.25 MHz, 375–625 MHz, 750–1750 MHz, and 2–4 GHz, respectively. Referring also to FIG. 5, local oscillator signals are produced on lines $160_1-160_5$ selectively in accordance with the detection of signals in the filter/heterodyning sections of stages $14_1-14_5$. More specifically, if a signal is detected in section 20, line 41 produces a logical 1 and a local oscillator frequency on line $f_{1a}$ passes through AND gate 500, summing amplifier 502, to line $160_1$ to produce a local oscillator signal having a frequency, here 3750 MHz. Likewsie, if a signal is detected in section 22, line 43 produces a logical 1 and a local oscillator signal on line $f_{1b}$, here having a frequency of 4750 MHz, passes to line $160_1$ via summing amplifier 502. Likewise, if signals are detected in both sections 20, 22, local oscillator signals having frequencies 3750 MHz and 4750 MHz are produced on line $160_1$. Referring again also to FIG. 1, it follows then that a received radio frequency pulse of frequency $f_0$ is, after passing through stages $14_1-14_5$, converted to an intermediate frequency signal and is, after modulation and amplification by modulator/amplifier 151 up converted and transmitted through antenna 600, as a radio frequency signal having the carrier frequency $f_0$.

For example, considering again a received signal having a frequency of 2837 MHz, as described above such signal passes through sections 20, 48, 66, 106 and 132 and appears at the output of summing amplifier/bandpass filter 138 as a signal having a frequency of 8.703125 MHz. In response thereto, logical 1 signals are produced on lines 41, 56, 82, 116 and 144. As shown in FIG. 5, frequency selector 158 produces, in response to such logical signals, signals on lines $160_1$, $160_2$, $160_3$, $160_4$ and $160_5$ having frequencies: 3750 MHz, 1375

MHz, 593.75 MHz, 164.0625 MHz, and 41.015625 MHz, respectively. With switch 148 in position "a", the output of summing amplifier/bandpass filter 138 is fed, through modulator/amplifier 151, to the up converter section 152. Therefore, the signal fed to such up converter section 152 is converted by up converter stages $154_5$–$154_1$ to frequencies: 32.3125 MHz, 131.75 MHz, 462.0 MHz, 913 MHz, and 2837 MHz, respectively. The signal having a frequency of 2837 MHz, now amplified and modulated, is transmitted via antenna 600.

Having described the preferred embodiment of this invention, it is evident that other embodiments incorporating these concepts may be used. For example, the frequency bandwidth may be other than that discussed, the number of frequency converter stages may be increased or decreased, the number of channels in each of such stages may be increased or decreased. It is felt, therefore, that this invention should not be restricted to the disclosed embodiment but rather should be limited only by the spirit and scope of the appended claims.

What is claimed is:

1. A radio frequency signal receiver for determining the frequency of a received signal, comprising:
   (a) a plurality of serially coupled frequency converter stages having successively smaller bandwidths, each one of said frequency converter stages including:
      (i) a plurality of bandpass filters adapted to pass signals within a first predetermined band of frequencies, each one of the plurality of filters having a different center frequency and being adapted to pass signals within a different portion of the first predetermined band of frequencies; and
      (ii) heterodyning means for converting the frequency of a signal passed by any one of the plurality of bandpass filters to a frequency within a second, smaller predetermined band of frequencies, such signal being fed to the next succeeding smaller bandwidth stage;
      (iii) a plurality of signal detector means coupled to the output of a corresponding one of the plurality of bandpass filters, for providing detection signals indicating which one or ones of the bandpass filters passes the received signal; and
   (b) frequency measuring means, responsive to the detection signals of the signal detector means, for providing an indication of the frequency of the received signal.

2. A radio frequency signal receiver comprising:
   (a) a plurality of serially coupled frequency converter stages for converting the frequency of a received signal to a frequency within a successively smaller band of frequencies, each one of said frequency converter stages including:
      (i) a plurality of bandpass filters adapted to pass signals within a first predetermined band of frequencies, each one of the plurality of filters having a different center frequency and being adapted to pass signals within a different portion of the first predetermined band of frequencies;
      (ii) heterodyning means for converting the frequency of a signal passed by any one of the plurality of bandpass filters to a frequency within a second smaller predetermined band of frequencies, such passed signal being fed to the next succeeding smaller bandwidth stage; and
      (iii) a plurality of signal detector means coupled to the output of a corresponding one of the plurality of bandpass filters, for providing detection signals indicating which one or ones of the bandpass filters passes received signals; and
   (b) oscillator means for providing heterodyning signals to each one of the heterodyning means of the plurality of serially coupled frequency converter stages and up converter means, fed by the last one of the serially coupled frequency converter stages, and responsive to the detection signals, for heterodyning the signal fed to said up converter means with selected ones of the heterodyning signals, such heterodyning signals being selected in accordance with the detection signals.

3. A radio frequency signal receiver for determining the frequency of a received signal, comprising:
   (a) a plurality of serially coupled frequency converter stages having successively smaller bandwidths, each one of such stages comprising:
      (i) a plurality of bandpass filters for passing signals having frequencies within a first predetermined band of frequencies, each one of such filters having the same bandwidth, B, and a different center frequency;
      (ii) a plurality of mixer means, each one fed by a corresponding one of the bandpass filters, for converting the frequencies of signals passed by the one or ones of the plurality of bandpass filters to frequencies within a second predetermined band of frequencies, such band of frequencies having a bandwidth, B, equal to the bandwidth of each one of the bandpass filters;
      (iii) means fed by each one of the mixer means for passing signals having a frequency within the bandwidth, B, to the succeeding smaller bandwidth converter stage through a common output line; and
   (b) means, responsive to the signal detecting means, for determining the frequency of the received signal fed to the plurality of serially coupled frequency converter stages.

4. The receiver recited in claim 3 including first means for producing a plurality of local oscillator signals and for coupling such signals to corresponding ones of the plurality of mixer means; second means, responsive to the local oscillator means and the plurality of signal detecting means, for coupling selected ones of such local oscillator signals to an output of such second means; and up converter means, fed by the last one of the serially coupled frequency converter stages and coupled to the output of the second means, for heterodyning signals fed thereto from such last stage with the selected ones of the local oscillator signals to produce a signal having a frequency equal to the frequency of a signal fed to the first one of the serially coupled frequency converter stages.

* * * * *